Figure 1:
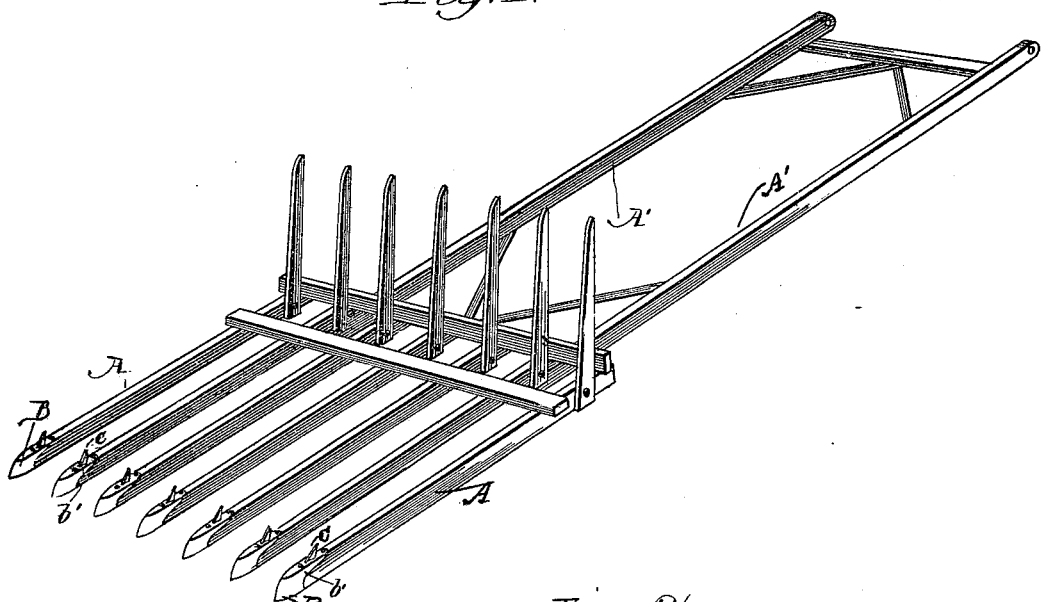

(No Model.)

H. A. ALDEN & J. E. KIRK.
METAL POINT FOR THE TEETH OF HAY RICKERS, &c.

No. 405,862. Patented June 25, 1889.

Witnesses

Inventors
Horace A. Alden &
John E. Kirk
By Price & Fisher
Attys.

UNITED STATES PATENT OFFICE.

HORACE A. ALDEN AND JOHN E. KIRK, OF PEORIA, ILLINOIS, ASSIGNORS TO THE ACME HAY HARVESTER COMPANY, OF SAME PLACE.

METAL POINT FOR THE TEETH OF HAY-RICKERS, &c.

SPECIFICATION forming part of Letters Patent No. 405,862, dated June 25, 1889.

Application filed December 24, 1888. Serial No. 294,545. (No model.)

*To all whom it may concern:*

Be it known that we, HORACE A. ALDEN and JOHN E. KIRK, citizens of the United States, residing at Peoria, in the county of Peoria, State of Illinois, have invented certain new and useful Improvements in Metal Points for the Teeth of Hay-Rickers, &c., of which we do declare the following to be a full, clear, and exact description, reference being had to the accompanying drawings, forming part of this specification.

Our present invention has relation more particularly to that class of hay-rickers in which there are employed long forwardly-projecting teeth that constitute a platform adapted to rest upon the ground and receive the hay from a suitable gathering-rake, the platform being provided with means whereby it can be raised in order to elevate its load to the top of a stack, an example of this type of hay-ricker being illustrated in Letters Patent No. 389,537, granted to the Acme Hay Harvester Company as the assignee of Horace A. Alden, September 18, 1888. In connection with this class of hay-rickers it is customary to employ gathering-rakes having the horses attached at each end, and having long forwardly-projecting teeth, upon which the load of hay is collected and drawn to the ricker-platform, the teeth of the rake passing between the teeth of the platform in order to deposit the load upon the platform, where it will remain while the rake is backed away.

In the manufacture of the platform-teeth of hay-ricking devices it has heretofore been customary to form the teeth with squared body-portions, the front ends of the teeth being subsequently pointed. This pointing of the wooden rake-teeth is not only a slow and expensive operation, but the teeth thus made are objectionable, for the reason that there is constant danger of their pointed ends becoming split or broken. Moreover, a difficulty incident to the manufacture of the pointed wooden ends is that if the tooth be cracked or checked adjacent its end it cannot be used, since a split in the end of the tooth would cause its speedy destruction.

Our present invention has, primarily, for its object to provide a metal point for the teeth of hay-rickers, whereby the objections incident to pointing the wooden ends of the teeth may be avoided; but certain features of our invention are applicable also to the manufacture of metal points for hay-rakes.

Our invention consists in the novel features of construction hereinafter described, illustrated in the accompanying drawings, and particularly pointed out in the claims at the end of this specification.

Figure 2:
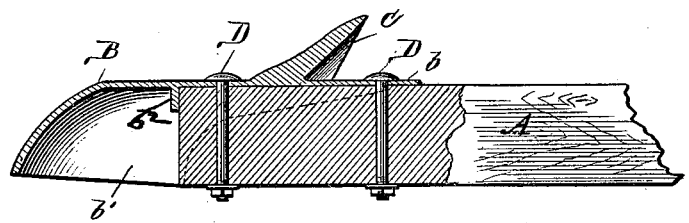
Figure 3:
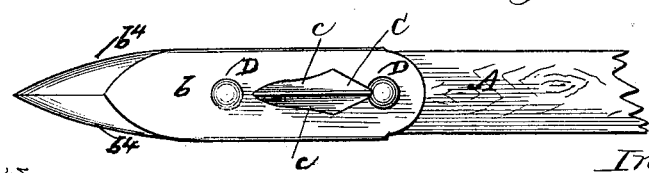

Figure 1 is a perspective view of a hay-ricker platform and its lifting-arms, the teeth of this platform being provided with metal points embodying our invention. Fig. 2 is an enlarged view, in vertical longitudinal section, through one end of the tooth-point and tooth. Fig. 3 is a plan view of the end of one tooth with the point attached thereto.

The platform of the ricker is shown as formed of a series of long teeth A, suitably attached to the ends of the swinging arms A', that serve to co-operate with the remaining parts of the ricker in lifting the platform and its load to the top of the stack in manner well understood. Upon the end of each tooth A is fixed a metal point B, preferably formed of cast or malleable cast iron or steel. The ends of the teeth A are of uniform size with the body of the teeth, and are square or blunt, the use of this form of blunt-ended tooth being possible when our improved metal point is employed in connection therewith. The metal point B is hollow and three-sided, being formed of the upper portion $b$ and the sides $b'$. The rear portion of the sides $b'$ are preferably cut away, as shown, to cheapen and lighten the construction, and from the upper part of the metal point projects the hook or extension C, the purpose of which is to securely guard against the withdrawal of the load of hay from the ricker-platform, when the rake that has deposited such load is backed away therefrom. This extension or hook C is preferably of the shape shown—that is to say, it is rearwardly and upwardly inclined, and has its faces $c$ beveled, in order to permit the hay to be readily drawn onto the platform without being caught by the hooks. Between the walls of the metal point B and formed integral therewith is preferably a rib or stop $b^2$, against which abuts the squared end of the tooth A, this rib or stop co-operating with sides b' of the metal point, and with the bolts D, that pass through the ends of the teeth and the metal points in holding the points firmly upon the teeth. The front portion of the metal point B is preferably formed of the inclined or curved shape shown—that is to say, the ends of the points are inclined or beveled from their lower portion backwardly and upwardly, as shown at $b^4$, the purpose of this construction being to enable the teeth of the rake to ride freely to their proper places between the points of the teeth of the ricker-platform. By forming the metal point B as a hollow three-sided casting, not only is a considerable saving in material effected and increased lightness secured, but we are thereby enabled to avoid the necessity of pointing the ends of the wooden teeth, it being simply necessary with our improved construction to attach the metal points to the square ends of the teeth. Moreover, the three sides of the metal point B serve to bind and protect the ends of the teeth A, so that a crack or split in the wood at the ends of the teeth is immaterial.

From the foregoing construction it will be plain that when the points of the ricker-platform are upon the ground in position to receive the load the long points of the rake-teeth carrying the gathered load can be forced between the teeth of the ricker-platform, the inclined or beveled ends of the metal teeth serving to accurately guide the rake-teeth into proper position. When the teeth of the hay-rake are thus caused to pass between the appropriate teeth of the ricker-platform, the load of hay will ride freely over the projections or hooks C, the inclined surface of these hooks presenting no material obstacle to the onward movement of the load. When, however, the load has been deposited and the teeth of the rake are drawn backward, the hooks or extensions C will effectively serve to prevent the withdrawal of the load from the ricker-platform.

It will be understood, of course, that the details of construction above set out may be varied without departing from the spirit of the invention, and that certain features of the invention may be used without its adoption as an entirety. Thus, for example, when our invention is to be employed in the construction of metal points for the teeth of hay-rakes, the retaining-hook C may be dispensed with, and the inclined or beveled end of the metal teeth will be modified or reversed, so that the danger of the sharp points of the teeth running into the ground will be avoided. It is obvious, however, that the use of metal points of our improved construction is of advantage, whether the precise details are followed or not.

Having thus described our invention, what we claim as new, and desire to secure by Letters Patent, is—

1. A hay-ricker-tooth point formed of metal and having its forward end inclined and beveled, and having projecting above its upper face and at a distance from its forward end an inclined hook or extension C, substantially as described.

2. The combination, with a tooth having a blunt end, of a metal point rigidly affixed thereto and having a socket the interior of which is provided with a suitable stop or rib for the end of the tooth, and having one side extending backward, whereby the point may be bolted to the tooth, substantially as described.

3. A tooth-point having its rear portion formed with suitable sides $b$ and $b'$ and with one side open, and having a socket to receive the squared end of the tooth, the interior of said socket being provided with a suitable stop or rib against which the end of the tooth will abut, substantially as described.

HORACE A. ALDEN.
JOHN E. KIRK.

Witnesses:
GEO. P. MILLARD,
F. E. ALDEN.